Dec. 25, 1962 W. J. VAN DER GRINTEN ETAL 3,070,644

THERMOELECTRIC GENERATOR WITH ENCAPSULATED ARMS

Filed Feb. 11, 1960 3 Sheets-Sheet 1

INVENTORS:
WILLEM J. van der GRINTEN,
ERWIN FISCHER-COLBRIE,

BY Dudley T. Ready
THEIR AGENT.

INVENTORS:
WILLEM J. van der GRINTEN,
ERWIN FISCHER-COLBRIE,

BY Dudley T. Ready
THEIR AGENT.

Dec. 25, 1962 W. J. VAN DER GRINTEN ET AL 3,070,644

THERMOELECTRIC GENERATOR WITH ENCAPSULATED ARMS

Filed Feb. 11, 1960 3 Sheets-Sheet 3

INVENTORS:
WILLEM J. van der GRINTEN,
ERWIN FISCHER-COLBRIE,

BY Dudley T. Keady
THEIR AGENT.

3,070,644
THERMOELECTRIC GENERATOR WITH ENCAPSULATED ARMS

Willem J. van der Grinten, De Witt, and Erwin Fischer-Colbrie, North Syracuse, N.Y., assignors to General Electric Company, a corporation of New York Filed Feb. 11, 1960, Ser. No. 8,020
3 Claims. (Cl. 136—4)

The present invention relates to thermoelectric generators. The thermoelectric generator herein described is a static device for converting heat to direct current electricity without the use of moving parts. It is in the class of devices often referred to as Seebeck converters.

A thermoelectric generator in producing electrical energy directly from a heat source depends upon the stimulation of carriers along a temperature gradient in a material. In a single member subjected to a temperature gradient, this stimulation of the carriers tends to create a current flow impelled by the temperature gradient. The direction and intensity of the current flow is a function of the nature of the material of the member.

In the usual construction, the thermoelectric generator consists of a plurality of paired members, with the members of each pair being of a material producing opposite directions of current flow when subjected to the same direction of temperature gradient. The members of each pair are electrically connected in series so as to provide, usually at the cold ends thereof, an addition to the thermally induced electromotive force. The individual pairs may then be connected in series or in parallel as desired to suit the output load requirements.

One criterion for selection of thermoelectric materials is the figure of merit Z:

$$Z=\frac{S^2}{\rho k}$$

where:

S is the Seebeck coefficient or thermoelectric power
$\rho$ is the electrical resistivity
$k$ is the thermal conductivity.

It is to be noted that the quoted figure of merit is strongly affected by the thermal conductivity and electrical resistivity of the material as well as the primary term, the Seebeck coefficient.

Another way of describing the requisitie properties of the thermoelectric materials is that the material should exhibit strong scattering of phonons so as to reduce the lattice component of thermal conductivity, and at the same time relatively weak scattering in the charge carrier system so as to obtain large charge density and mobility of the desired charge.

In achieving these somewhat conflicting conductivity requirements in semiconductors of the "broad band" type, these may be reconciled by appropriate doping of the host lattice. In the usual event, the "doping" concentration levels are extremely high when compared to those used in transistor devices. With respect to thermoelectric materials, additives or the constituents themselves can be the doping ingredients. They are present in proportions whose precise value is a matter of considerable importance in determining the thermoelectric efficiency of the material.

In certain thermoelectric materials the ingredients may be said to be compounds, in that the proportions are very close to stoichiometric proportions. Examples of such materials are PbTe and PbSe. Accordingly, in both the alloy and compound types of semiconductor materials for thermoelectric generation, it is essential that the optimum proportions be initially achieved and retained throughout the life of the generator in the interest of high thermoelectric efficiency. The excess of either component is usually on the order of one atom in one thousand. In such materials, a variation in composition of one part in 10,000 has a substantial effect upon the nature and magnitude of the Seebeck voltage. In other thermoelectric materials, the ingredients may be said to be alloys in that the proportions, while not stoichiometric, are yet critical to a considerable degree, being critical usually however to one part in 100 or one part in 1,000. Such an alloy is BiSb.

A variety of problems are presented in the design of a practical "TE" generator which has a high efficiency. cause of the properties of the materials and the desirably small size of the generators it has proved difficult to maintain proper thermal, mechanical and compositional stability of the elements as well as their optimum electrical performance. These problems are particularly pronounced at high temperature operation where materials have substantial thermal expansion mismatches and changes in properties occur. Phenomena which occur are evaporation, oxidation, dissociation and other types of mass transport, all of which affect the composition and therefore, the performance. Although it has been found helpful in some applications to encase entire "TE" generators in a hermetically sealed container, stable operation has been difficult or impossible to achieve reliably in the neighborhood of 1000° K. by this measure. Prior art sealing techniques have been insufficient in preventing mass transport and unsuitable for use at temperatures in the region of the melting points.

Accordingly, is is an object of this invention to improve the thermal, mechanical and compositional stability as well as the electrical performance of a thermoelectric generator.

It is a further object of the invention to extend the temperature range of operation of "TE" materials.

In accordance with certain illustrated embodiments of the invention, thermoelectric generators are provided in which the individual arms of the thermocouple are encapsulated in such a manner that all surfaces of the "TE" materials are sealed. Encapsulated arms are produced which form generator pairs with superior stability.

The invention will be better understood from the following description taken in connection with the accompanying drawings and its scope will be pointed out in the appended claims.

Figure 2:
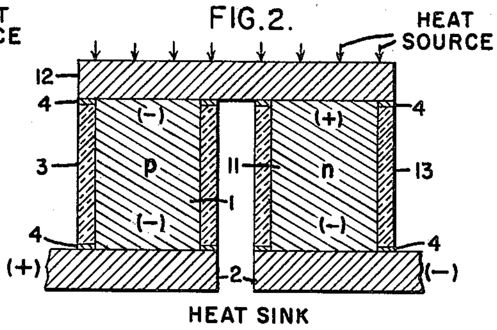
FIGURE 2 illustrates an encapsulated thermocouple in accordance with the present invention.
Figure 3A:
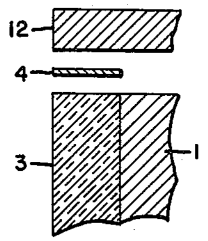
Figure 3B:
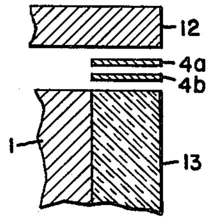

FIGURE 3*a* and FIGURE 3*b* represent suitable arrangements of elements to provide a reactive alloy seal suitable for use in the embodiment shown in FIGURE 2.

Figure 4:
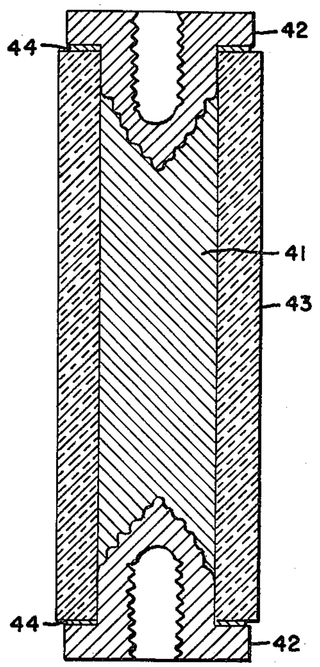

FIGURE 4 is an elementary arm design embodying the invention for use in a "TE" generator.

Figure 5:
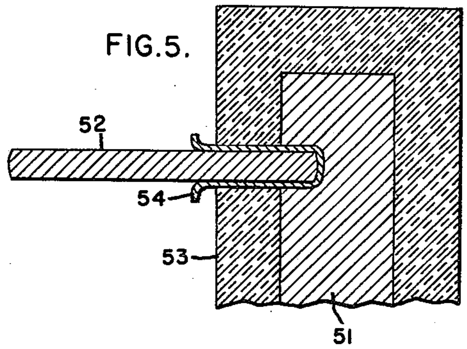

FIGURE 5 presents a novel slotted arm construction for use in a "TE" generator.

Figure 6:
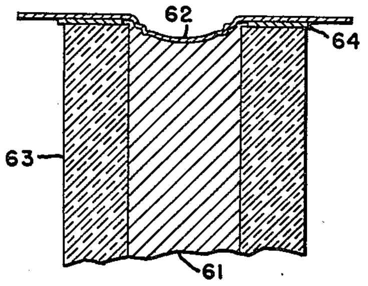

FIGURE 6 illustrates a novel "TE" arm construction utilizing an elastic electrode.

Figure 7:
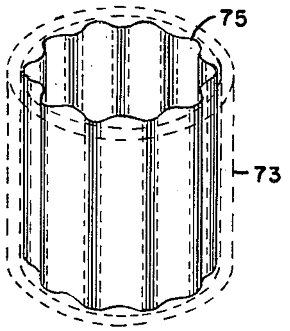

FIGURE 7 illustrates a novel radially elastic wall construction for use in a "TE" arm.

Figure 8:
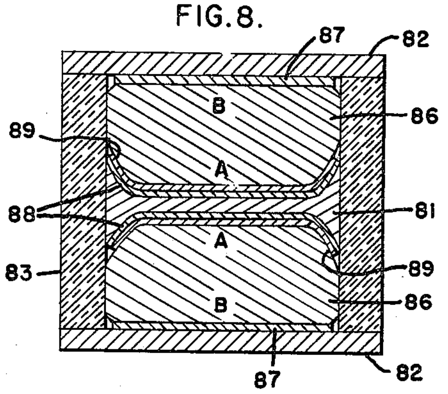

FIGURE 8 illustrates novel arm construction for use in a "TE" generator allowing radial and axial compensation for differences in thermal expansion.

Figure 9:
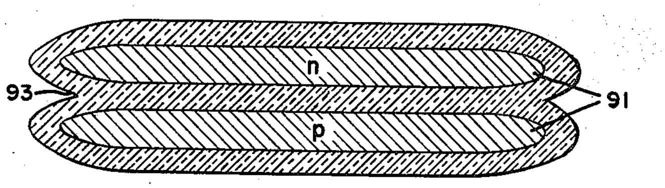

FIGURE 9 illustrates a thermocouple embodiment with elongated, encapsulated arms.

Figure 10:
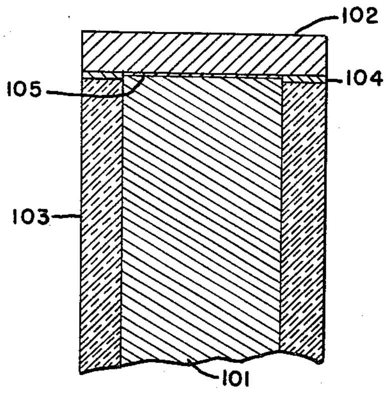

FIGURE 10 illustrates a "TE" cell construction utilizing corrosion resistant clad electrodes.

Figure 11:
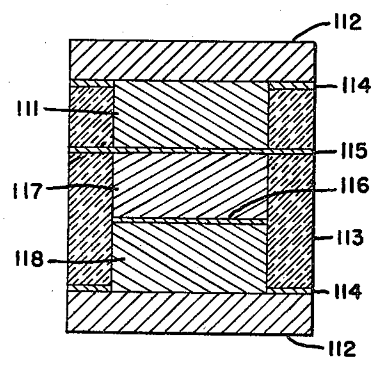

FIGURE 11 illustrates a "TE" cell composed of cascaded "TE" materials.

Figure 12:
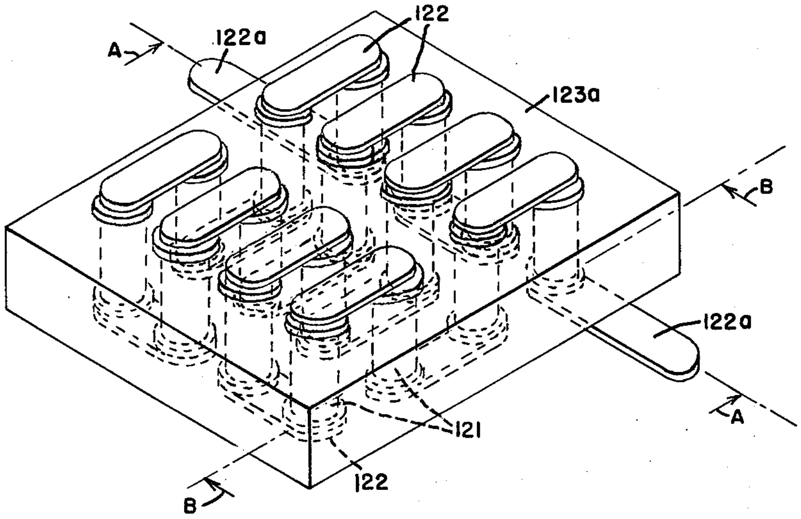

FIGURE 12 illustrates a "TE" generator utilizing a number of series connected arms embedded in a block forming a common encapsulation for the arms.

Figure 12A:
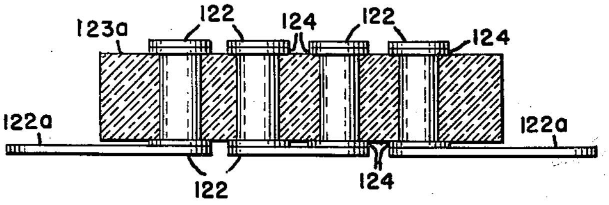

FIGURE 12A is a section along A—A of FIGURE 12.

Figure 12B:
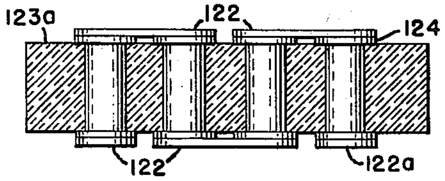

FIGURE 12B is a section along B—B of FIGURE 12.

Figure 1:
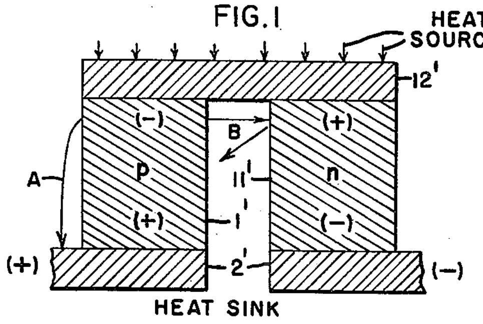
FIGURE 1 illustrates an unencapsulated thermocouple, not incorporating the inventive measures.

FIGURE 1 illustrates the general arrangement of a single generator pair, usually in a series of a large number of generator pairs. As shown, a pair of arms 1' and 11' are composed of n and p type "TE" materials, respectively, and are bonded electrically and thermally (by solder, for example) between metal contact pieces 2' and 12'. A temperature gradient through the "TE" material is obtained by applying a heat source and a heat sink to the pieces 12' and 2', respectively. The "TE" series connection of these materials results from the alternate arrangement of n and p type materials and the staggered electrode contact pieces. In what follows we shall assume that the n and p arms of the thermocouple are preferably composed of broad band semiconductors of the intermetallic type. It should be understood, however, that the invention is not to be restricted to the use of this type of material. The n and p designations refer to carrier mechanisms by electron (n) and hole (p) conduction, respectively.

The efficiency of a thermoelectric generator may be given by the simplified expression:

$$\text{Eff.}=\frac{E_{\text{out}}}{Q_{\text{in}}}=\frac{T_{\text{hot}}-T_{\text{cold}}}{T_{\text{hot}}}\cdot\frac{M-1}{M+\frac{T_{\text{cold}}}{T_{\text{hot}}}}$$

wherein the ratio of output electrical energy $E_{out}$ to heat input $Q_{in}$ is a function of the temperatures and a material term, M to be defined below.

Since the generator represents a heat engine we find a $$\frac{T_h-T_c}{T_h}$$

term, the Carnot efficiency, which term is multiplied by a material performance term $$\frac{M-1}{M+\frac{T_c}{T_h}}$$

both terms being smaller than one.

Considering the Carnot efficiency only, it is obvious that the efficiency can be increased by increasing $T_h-T_c$. In doing so, it is normally more practical to increase $T_h$ than to reduce $T_c$ below the ambient temperature.

If one wishes to operate the generator at higher temperatures, experience has shown the necessity of enclosures for thermoelectric materials. This is particularly true in the region around 1000° C. as contemplated herein. Enclosures for these materials are preferably stable at higher temperatures than the operating temperature of the materials. This is in part because of the direct exposure of enclosures to the heat source. In general, the enclosures constructed in accordance with the teaching of the present invention are stable at temperatures higher than 1150° C. An increase in efficiency is not assured, however, by increase of the operating temperature difference absent adequate thermoelectric material performance in the new temperature range.

The material term M in the efficiency expression, takes the following form:

$$M=\sqrt{1+\frac{S^2}{\rho k}\times\frac{T_c+T_h}{2}}$$

here, S represents the Seebeck coefficient in V/° K.; $\rho$, the resistivity in ohm cm.; and $k$, the thermal conductivity in watts per cm. ° K. The well known term, $$\frac{S^2}{\rho k}$$

is called the figure of merit, Z, of a thermoelectric material having the dimensions ° K.—1.

Since S, $\rho$, and $k$ are temperature dependent, Z is also a function of temperature with the result that, if certain materials exhibit useful figures of merit at all, it is within a certain temperature range.

With increasing temperature differences (desirable from the Carnot cycle point of view), a designer of a thermoelectric generator will select thermoelectric materials which perform well in the selected temperature ranges and in certain cases spanning wide temperature ranges cascade these materials in each arm, thus placing the individual materials in the temperature range of best performance.

Certain intermetallic semiconductors, such as lead telluride, zinc antimonide, indium arsenide-phosphide, manganese telluride, and germanium telluride are examples of materials which exhibit useful thermoelectric properties. These materials however, have definite limitations as to their highest operating temperature. In the past, the operation of many "TE" materials has been limited to .65–.7 of their melting points, absolute scale.

As previously explained, one such cause of deterioration at high temperatures is oxidation. It is known that such an impairment of performance can be avoided by hermetically sealing the "TE" generator and by operating the thermocouples in a controlled atmosphere. This technique, however, has no curative effect with respect to other processes leading to an unsatisfactory performance of a "TE" generator.

Another undesirable effect produced by the presence of a temperature gradient at high temperature operation of a "TE" generator is mass transport which may be one of two types. An illustration of the resultant effects of this phenomenon is given in FIGURE 1. It is assumed here that the n and p type arms of the generator exhibit relatively high vapor pressures at temperatures approximating those of the heat source. As a result of this, a material transport occurs from the hot zones of the sublimated material to the cold zones of the same material as indicated by the arrow A. Likewise, the n type material may be transported to the p type arms and vice versa as indicated by B. Both processes result in a deterioration of the "TE" material and the generator performance is correspondingly decreased in efficiency.

FIGURE 2 illustrates the encapsulation technique applied to one generator pair usually in a "TE" generator having a large number of such pairs, in accordance with the disclosed invention. The bodies of "TE" material 1 and 11 of p and n type materials, respectively, are encapsulated by plate-like electrodes 2 and 12 on opposite ends and casings 3 and 13 covering the remaining surfaces. The entire surface of the "TE" material is thereby sealed. The bodies of "TE" material and the mating casings tightly fitting the surfaces thereof are conveniently cylindrical in form. The plate-like electrodes 2 and 12 each have a length sufficient to connect two adjoining bodies of "TE" material (1 and 11) and, with a staggered arrangement, a series connection between adjoining arms is obtained. Two lines of coplanar plate-like electrodes result which are suited to be placed between a heat source and heat sink.

The large effects on the thermoelectric properties of a material, caused by small changes in composition resulting from such mass transport processes can better be appreciated, if it is recalled that the electrical properties of a compound semiconductor, such as lead-telluride or zinc-antimonide, may depend very critically on the proportion of said compound constituents. Even very small deviations from the required proportions of its constituents may cause drastic changes not only in the electrical conductivity of the material but also in the Seebeck coefficient and its thermal conductivity. One of the primary considerations of optimum performance is the presence of a selected level of doping, usually on the order of $10^{19}$ atoms per cubic centimeter. The semiconductors are prepared so as to provide this doping concentration. Variations of the relative properties of the materials from the original preparation on the order of hundredths of a percent can change the carrier concentration appreciably. In fact such changes may even reverse the polarity of the thermoelectric effect and thereby drastically reduce the figure of merit.

The use of individual encapsulation in accordance with this invention greatly improves the performance of many "TE" materials. Such "cells" can be operated at higher temperatures and their stability is greater. For example, encapsulated lead telluride shows its maximum Seebeck coefficient at 1020° K. and other semiconductors may be operated at about nine tenths of their melting point encapsulated. In addition to this, the figures of merit of materials such as lead telluride and zinc antimonide have been found to be higher than could be expected from the prior art values extrapolated to higher temperatures. The increased stability of such capsules also leads to an improvement of the operating lifetime and to an improvement of the relability. Furthermore, encapsulation facilitates the fabrication of stable low contact resistance junctions, and since many of the materials with desirable "TE" properties are lacking in mechanical strength, the mechanical stability of the "TE" components is also improved by the encapsulation. The encapsulation technique also facilitates the segmentation of "TE" materials which is an almost indispensable feature for the attainment of high efficiencies wherever large temperature differences are available.

The materials suitable for encapsulation are varied. The requirements of both the casing and the electrodes are that they have melting points in excess of the operating temperature and introduce no corrosion effects. The electrodes must be relatively good thermal and electrical conductors and the casings must be relatively poor thermal and electrical conductors if requirements are set for high efficiency. Suitable electrode materials are iron and molybdenum and the casings may be refractory materials such as glass, ceramic or thin, high resistance metals. One method which proved useful for sealing the metal to the ceramic is the method developed by J. E. Beggs for vacuum tubes and described in the IRE Transactions of the PGCP, vol, CP-4, No. 1, March 1957, "Sealing Metal and Ceramic Parts by Forming Reactive Alloys."

An alternative to the use of a ceramic casing is a metal casing. With metal, the casing is made thin, approximately .01 inch thick and composed of vanadium steel or Nichrome or other metals which have a sufficiently high resistivity and satisfactory stability. The sealing of the metal casing to the electrode is obtained by the reactive alloy seal of Beggs, above, or any other suitable metal to metal bond.

FIGURES 3*a* and 3*b* are exploded views of the seal between casing and electrode of the generator shown in FIGURE 2. FIGURE 3*a* shows a construction suitable for larger expansion coefficients such as $10-15\times10^{-6}/°$ C. a coefficient common among "TE" materials. In this example the "TE" material 1 is encapsuled in a ceramic casing 3 made of Forsterite which is joined to the iron electrode 12 by a seal element 4 of titanium. FIGURE 3*b* represents an alternative construction. In this example, an alumina casing 13 is joined to a molybdenum electrode 12 by two sealing elements 4*a* and 4*b*. Since the molybdenum will not form a reactive alloy seal with the ceramic casing, the second seal element is required. The seal elements 4*a* and 4*b* are iron and titanium, respectively. These combinations of materials provide a suitable matching of temperature coefficients of expansion, thereby minimizing expansion mismatch.

An example of a single arm is given in FIGURE 4. This design provides iron electrode plugs 42 which are approximately a ¼ inch in diameter and have been provided with cone-like extensions protruding into the ends of the cylindrical bodies of thermoelectric material 41. These cones exhibit a rough surface to facilitate the electrical as well as the thermal contact between the "TE" material and its two electrodes. In the assembly of the cell, the bottom electrode is first sealed to a cylindrical Forsterite ceramic casing 43 which is about 1 inch in length, by means of the lower titanium washer 44 which is typically 0.003 inch in thickness. The bottom seal is formed by heating to a temperature in excess of 1055° C. in a good vacuum. Subsequently, the Forsterite tube is filled with a semiconductor "TE" material. This may require melting and refilling thereafter to provide the necessary surface contact of the "TE" material 41 with the casing 43. Another titanium washer and the top electrode are placed in position and with spring loading, the package is again heated for a short duration at a temperature in excess of 1055° C. to complete the hermetic seal. Alternatively, the cells can be prefabricated empty of "TE" material and then filled through stems attached either to the ceramic or the electrode. The semiconductor materials, upon melting and then cooling, form satisfactory electrical and thermal bonds with the electrodes.

FIGURE 5 illustrates another electrode arrangement where the generator arm is preformed with the body of "TE" material 51 completely encapsulated in the cylindrical casing 53. In this case, the selected metal 54, which forms a eutectic bond with the electrode material, is folded around the plate-like electrode 52, forming a sheath, and inserted in slots cut in the cylindrical ceramic wall 53. The "TE" material 51 is then resealed by means of the usual heat treatment.

Depending on the geometry, certain differences in the expansion coefficients of the casing and the "TE" materials are allowable. The choice of the ceramic and its electrodes can, in many cases, meeet such tolerances. For example, a high expansion Forsterite, which matches approximately the expansion of pure iron has been used successfully for materials with expansion coefficients close to that of iron. Alumina is a useful casing material for low expansion thermoelectric materials.

FIGURE 6, by an exaggerated diagrammatic representation, illustrates one modification of FIGURE 2 which provides compensation for an expansion mismatch along the axis of the cell. Here, the plate-like electrode 62 is in the form of a sheet sufficiently thin to allow for variations in expansion between the body of "TE" material 61 and the casing 63. The washer 64 provides the usual reactive seal. For an iron electrode, as an example, the thickness would be typically .01 inch.

Compensation for a mismatch in radial expansion between the "TE" material and its casing in the configuration of FIGURE 2 can be provided by the arrangement illustrated in FIGURE 7. A layer 75 of elastic material can be provided between the cylindrical ceramic casing 73 and the body of "TE" material resulting in a coating or housing in intimate surface contact with the "TE" material. A suitable material for the layer 75 is a completely inorganic compound such as Eccoceram CS.

Another form of axial expansion compensation is shown in FIGURE 8. Within the casing 83, metallic plugs 86 are placed between the plate-like electrodes 82 and the bodies of "TE" material 81. Basic to this type of compensation is a difference in expansivity between the casing 83 and the plugs 86. If it is desired to obtain an expansion match for a "TE" material 81, the expansivity of which is greater than the expansivity of the casing 83, we must select a plug material which has an expansivity which is less than that of the ceramic. After this selection has been made, the proper match can be obtained by adjusting the relative axial proportions of the cell components.

Obviously, the heat conducted through any enclosure bypasses the "TE" material, thereby reducing the overall efficiency of the generator. The choice of a geometry, however, in which a large thermal gradient is applied to the "TE" material, and a small one to the housing, reduces such heat losses. Likewise, a large cross setional area of the "TE" material compared to the cross sectional area of the cell enclosure will also improve the efficiency. In the cell configuration of FIGURE 8, wherein the "TE" material 81 is shaped so that it has a reduced thickness in the center of the cell, efficiency is improved because the heat flow follows a longer path through the ceramic casing 83 than through the "TE" material 81. The thermal efficiency is preserved in this arrangement by insuring that serially arranged plugs 86 have maximum thermal conductivity so as to localize the maximum thermal drop in the "TE" material.

Also, thin layers of solder are interposed between different materials, 82 and 86, 81 and 86, as shown at 87 and 89, respectively, in FIGURE 8. Since under operating conditions the solder will be in the liquid state, it will act as a lubricant and alleviate radial expansion mismatches which is particularly useful for the plug embodiment. To prevent contamination of the "TE" material, metallic foils 88 are interposed between the solder 89 and the "TE" material 81.

FIGURE 9 illustrates the cross section taken parallel to the electrodes of an elongated "TE" cell. The "TE" cell is formed by elongated bodies of "TE" material 91 placed in a close, parallel array with the plate-like electrodes above and below the array (not shown). The advantages are twofold. By keeping dimensions across the array, in the ordinate direction, small, including a common casing section 93, it it possible to minimize the effects of differential expansion between the different cell components. Furthermore, this positioning of the n and p arms, as shown in FIGURE 9, makes it possible to minimize the resistive losses due to the current flow in the contact pieces which in turn makes it possible to use thin and flexible electrode materials.

FIGURE 10 illustrates a suitable variation of the FIGURE 2 construction for use where the interposed body of the "TE" material 101 is reactive with the material chosen for the plate-like electrode 102. An example is where the "TE" material is HgSe, mercury selenide, and the electrode is iron. In such a case, a coating 105 is provided on the electrode over the area of contact with the "TE" material 101. In the situation of HgSe and iron, chromium clad to the electrode is satisfactory. The casing 103 is reactively bonded to the electrodes 102 with the washer 104 in the usual manner.

FIGURE 11 presents an embodiment wherein a plurality of "TE" materials are cascaded. In view of the nonlinearity of the thermoelectric properties over a wide temperature range, efficiency of a "TE" cell can be increased by arranging bodies of different "TE" materials 111, 117, and 118 in series between the plate-like electrodes 112. In such an arrangement, it is often necessary to provide intermediate electrodes in the form of membranes 115 and 116 between the layers of "TE" material. The basis of selection of metals for the membranes 115 and 116 is the same as for electrodes 112. In those cases where there is no metal which has compatible thermoelectric properties with both adjacent layers of "TE" material, a double membrane can be used. It is usually more satisfactory to fabricate the cascaded cell with the membranes extending across the encapsulation wall 113 as illustrated by membrane 115.

FIGURE 12 illustrates an example of the construction of a complete "TE" generator unit. This unit is formed of a rectangular block **123*a* which provides a common encapsulation for individual arms and is made of a ceramic with a suitable expansion coefficient such as Forsterite. The "TE" material 121 fills transverse cylindrical holes in the block 123*a*. Plate-like electrodes 122 in the form of metal plates are sealed to the block with the washers 124 in the manner described above and provide electrical series contact between the adjacent cylinders of "TE" material. The electrodes 122*a*** provide electrical output terminals to the apparatus utilizing the generator. Generator units may be connected in series to provide a higher voltage source. FIGURES 12A and 12B in their sectional views present details of construction.

While the fundamental novel features of the invention have been shown and described as applied to illustrative embodiments, it is to be understood that the invention is broad in scope. All modifications, substitutions and omissions obvious to one skilled in the art are intended to be within the spirit and scope of the invention as defined by the following claims.

What is claimed is:

1. A hermetically encapsulated thermoelectric generator element of integral construction adapted to convert thermal energy to electrical energy at high temperatures comprising:
   (*a*) a body of composite thermoelectric material having precise proportions which are critical for optimum thermoelectric generation;
   (*b*) a pair of electrodes having a temperature coefficient of expansion approximately matching said body, providing electrical terminals at the ends of said body and forming a portion of an encapsulating housing;
   (*c*) a ceramic casing having a temperature coefficient of expansion approximately matching said body arranged to form, together with said electrodes, an integral thermoelectric element having a housing in molded, intimate surface contact with said body such as to prevent deterioration of the said thermoelectric material through mass transport and to provide mechanical reinforcement to said body; and
   (*d*) a high temperature seal between each of said electrodes and said ceramic casing to provide a hermetically sealed housing for said body of thermoelectric material.

2. A hermetically encapsulated thermoelectric generator element of integral construction adapted to convert thermal energy to electrical energy at high temperatures comprising:
   (*a*) a body of composite thermoelectric material having precise proportions which are critical for optimum thermoelectric generation;
   (*b*) a pair of electrodes having a temperature coefficient of expansion approximately matching said body, providing electrical terminals at the ends of said body and forming a portion of an encapsulating housing;
   (*c*) a ceramic casing having a temperature coefficient of expansion, approximately matching said body arranged to form, together with said electrodes, an integral thermoelectric element having a housing in bonded, intimate surface contact with said body such as to prevent deterioration of said thermoelectric material through mass transport and to provide mechanical reinforcement to said body; and
   (*d*) a high temperature seal between each of said electrodes and said ceramic casing to provide a hermetically sealed housing for said body of thermoelectric material.

3. A hermetically encapsulated thermoelectric generator element of integral construction adapted to convert thermal energy to electrical energy at high temperatures comprising:
   (*a*) a body of composite thermoelectric semiconductor material having precise proportions which are critical for optimum thermoelectric generation;
   (*b*) a pair of electrodes having a temperature coefficient of expansion approximately matching said body, providing electrical terminals at the ends of said body and forming a portion of an encapsulating housing;

(c) a ceramic casing having a temperature coefficient of expansion, approximately matching said body arranged to form, together with said electrodes, an integral theremoelectric element having a housing in molded, intimate surface contact with said body such as to prevent deterioration of the said semiconductor material through mass transport and to provide mechanical reinforcement to said body; and (d) a high temperature eutectic seal between each of said electrodes and said ceramic casing to provide a hermetically sealed housing for said body of thermoelectric material.

References Cited in the file of this patent

UNITED STATES PATENTS

| | | |
|---|---|---|
| 1,848,655 | Petrik | Mar. 8, 1932 |
| 2,626,970 | Hunrath | Jan. 27, 1953 |
| 2,886,618 | Goldsmid | May 12, 1959 |
| 2,903,857 | Lindenblad | Sept. 15, 1959 |
| 2,906,801 | Fritts | Sept. 29, 1959 |
| 2,932,954 | Evans | Apr. 19, 1960 |
| 2,938,357 | Sheckler | May 31, 1960 |
| 2,942,051 | Roeder | June 21, 1960 |
| 2,947,150 | Roeder | Aug. 2, 1960 |
| 2,949,497 | Jarvis et al. | Aug. 16, 1960 |
| 2,951,105 | Busanovich | Aug. 30, 1960 |